March 2, 1937. R. W. KEELER 2,072,111
ROAD GRADER
Filed Aug. 8, 1933 5 Sheets-Sheet 2

INVENTOR:
Raymond W. Keeler,
BY
Chas. M. Nissen,
ATT'Y.

March 2, 1937.　　R. W. KEELER　　2,072,111
ROAD GRADER
Filed Aug. 8, 1933　　5 Sheets-Sheet 4

INVENTOR:
Raymond W. Keeler,
BY
Chas. M. Nissen,
ATTY.

March 2, 1937.   R. W. KEELER   2,072,111
ROAD GRADER
Filed Aug. 8, 1933   5 Sheets-Sheet 5

INVENTOR:
Raymond W. Keeler,
BY
Chas. M. Nissen,
ATTY.

Patented Mar. 2, 1937

2,072,111

UNITED STATES PATENT OFFICE

2,072,111

ROAD GRADER

Raymond W. Keeler, Galion, Ohio, assignor to The Galion Iron Works and Manufacturing Company, a corporation of Ohio Application August 8, 1933, Serial No. 684,183

21 Claims. (Cl. 180—1)

My invention relates to road making machinery and this application is a continuation in part of my copending application Serial Number 584,517, filed January 2, 1932, for an improvement in Hydraulic lifting mechanism for road graders.

One of the objects of my invention is the provision of improved and efficient mechanism for demountably connecting a tractor unit, particularly of the crawler type, to the frame of a road grader, but it should be understood that such tractor unit may be of other types and the invention may have a general application.

Another object of the invention is the provision of extensible hanger mechanism between the frame of a vehicle and the front end of a power plant pivoted to the frame for vertical oscillation relatively thereto.

A further object of the invention is provision of shock absorbing mechanism between the frame of a vehicle and the front end of an engine mounted on cushioning springs and connected to such frame to have limited movements laterally relatively thereto.

Another object of the invention is the provision of means for flexibly mounting an engine on the frame of a vehicle to permit lateral and longitudinal movements relatively thereto on transverse and longitudinal axes by providing yielding supports greatly restricting the lateral movement and by providing additional yielding supports which permit a relatively wide range of movements of said engine relatively to said frame on the transverse axis.

A further object of the invention is the provision of improved mechanism for mounting a tractor unit for vertical oscillation on a transverse axis in a vehicle frame which has lateral oscillation on a longitudinal axis at its forward end so that when one side of the tractor unit rides over a hillock or into a depression the tractor unit may oscillate vertically on its own transverse axis and may oscillate laterally with the vehicle frame on said longitudinal axis.

More particularly it is the object of the present invention to provide elongated telescopic hangers for suspending from an upwardly bowed frame of a road grader the front end of a tractor unit of the crawler or other type which is free to have a vertical oscillation relative to the frame to the extent permitted by shock absorbing springs in the hangers.

Other objects of the invention will appear hereinafter, the novel features and combinations being set forth in the appended claims.

An embodiment of my invention is illustrated in the accompanying drawings, wherein.

Figure 2:
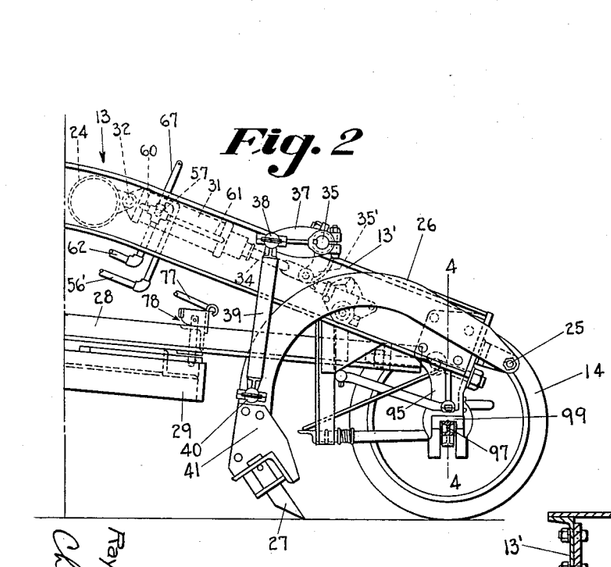
Figure 3:
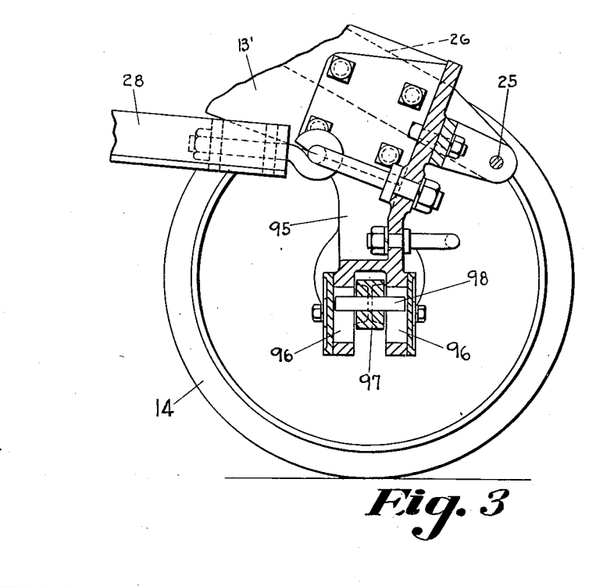
Fig. 3 is an enlarged sectional elevation of the forward end of the vehicle frame to show the forward longitudinal axis for limited lateral oscillation of the frame.
Figure 4:
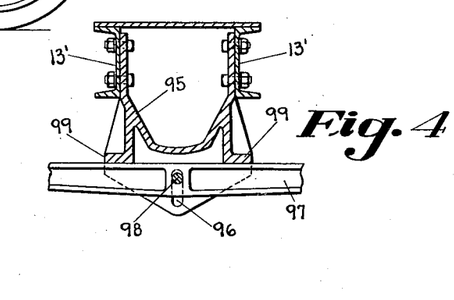
Fig. 4 is a sectional elevation of a detail of construction, taken on the line 4—4 of Fig. 2.
Figure 5:
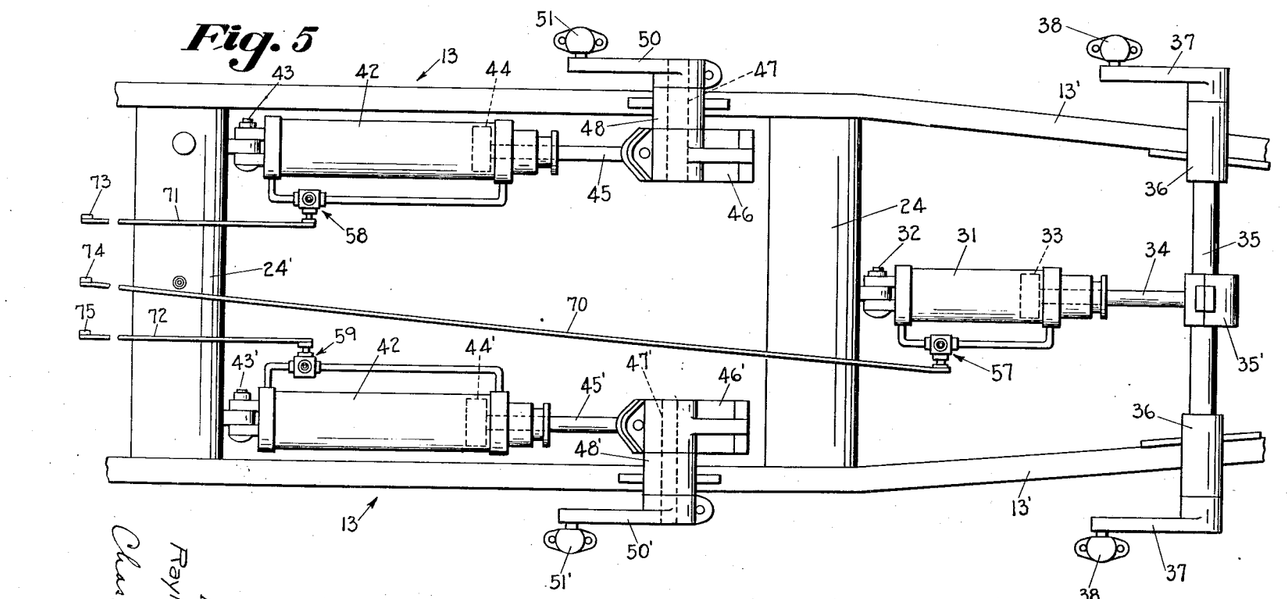
Fig. 5 is a plan view of a portion of the structure shown in Fig. 1.
Figure 6:
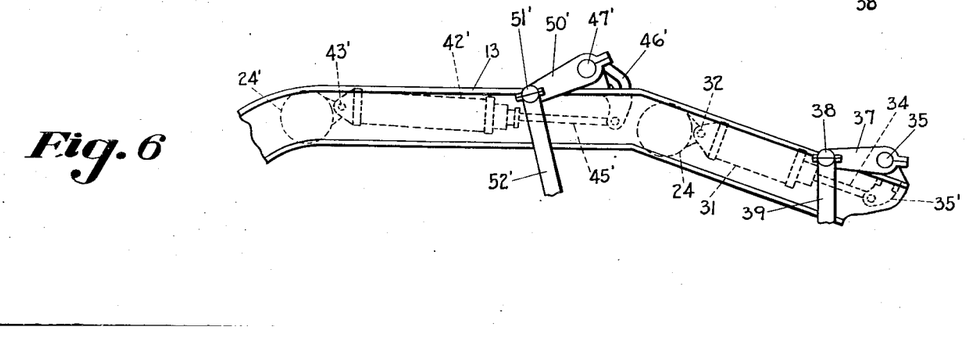
Fig. 6 is a side elevation of the rear portion of the structure shown in Fig. 5.
Figure 10:
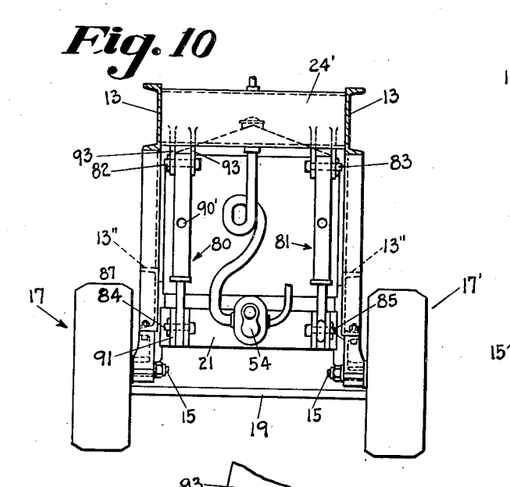
Fig. 10 is a transverse sectional elevational view taken on the line 10—10 of Fig. 1 looking in the direction of the arrows to show in front elevation the spaced-apart elongated telescopic hangers between the upwardly bowed frame of the grader and the front end of the vertically oscillatable tractor unit of the crawler type.

In the accompanying drawings the grader frame comprises two longitudinally extending, upwardly curved or bowed frame beams 13, 13 each of which is channel shaped in cross section as shown in Fig. 10. The front ends of these beams are converging and downwardly inclined as shown in Figs. 2, 5, and 6 and operatively supported upon the front steering wheels as shown in Figs. 2, 3, and 4, by means of self-adjusting bolster mechanism.

Figure 1:
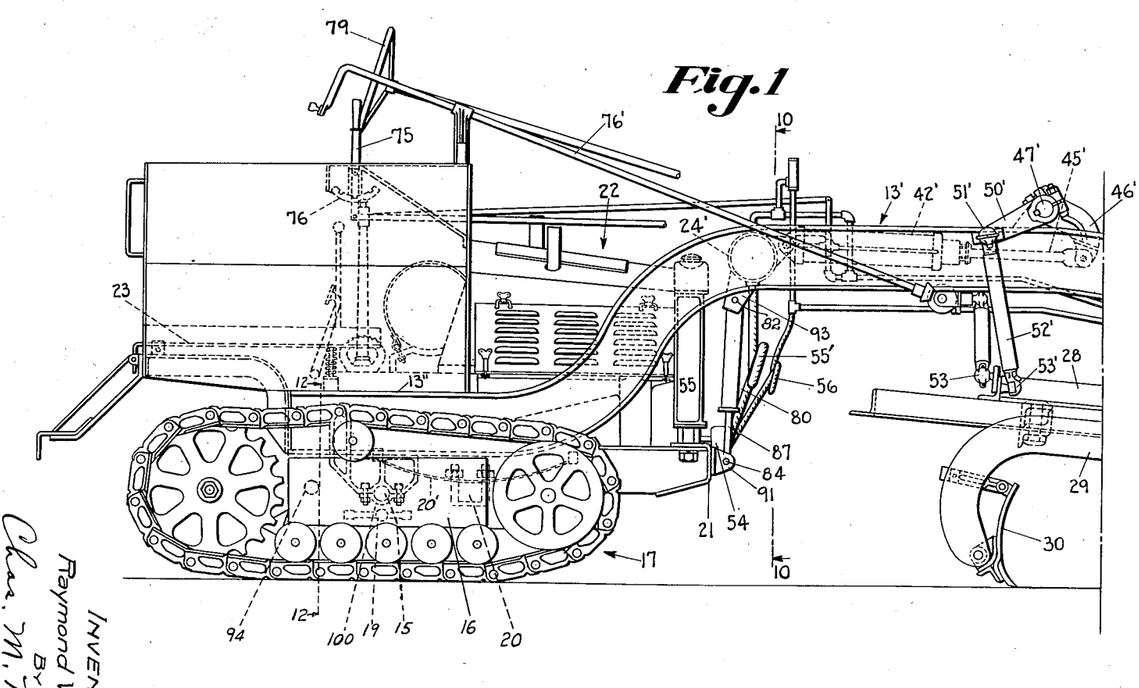
Figs. 1 and 2 placed end to end constitute an elevation of a road grader including the features of my invention.

The rear ends of the beams 13, 13 are horizontal and in a relatively low horizontal plane as shown at 13", 13" in Figs. 1 and 10. Such horizontal rear ends of the grader frame 13 are pivoted at 15, 15 to the sides of the frame 16 of the crawler designated generally 17, but as this crawler type of tractor unit may be of well-known construction and demountable for general use separately from the grader, I have not attempted to illustrate the same in detail.

The frame of the crawler comprises the side plates 16 rigidly connected by the cross-bar 19 as shown in Figs. 1 and 10. Projecting inwardly from the side plates 16 are studs 20 to which are clamped for support the leaf springs 20'. On the ends of these springs is mounted the frame 21 of the internal combustion engine designated generally 22. The frame 13' also supports the platform 23 upon which the operator rides. The controls for the engine, for the steering mechanism and for the hydraulic adjusting apparatus, extend to the single station at the operator's platform 23.

The main supporting frame comprising the spaced-apart side beams 13, 13 is a single rigid structure in that the beams 13, 13 are connected at intervals to each other, as for instance at two points, by transversely extending cylindrical hollow or tubular cross braces 24, 24' which are relatively large and rigid and welded to the beams 13, 13. Pivotally connected at 25 to the forward ends of the converging and downwardly extending portions 13', 13' of the main supporting frame of the machine are the two rearwardly extending scarifier arms 26. These arms carry the usual scarifier teeth 27 which may be raised or lowered on the horizontal transverse axis at the pivots 25.

The drawbar 28 which supports the circle 29 and the moldboard 30 may be of any usual or suitable character and is pivotally supported at its forward end so that the rear end of the drawbar together with the circle and moldboard may be raised or lowered. Preferably the mounting of the drawbar is such that either end of the moldboard may be raised or lowered independently of the other end so that the moldboard may be disposed at an inclination to the horizontal transversely of the machine. Inasmuch as this is also of well-known construction in road working machinery, I have not attempted to illustrate the same in detail.

My invention relating to the means whereby the scarifier may be raised and lowered and to the means whereby the moldboard may be raised or lowered either bodily or at one side or the other, I have disclosed and claimed in my co-pending application Serial Number 584,517, filed January 2, 1932, for an improvement in Hydraulic lifting mechanism for road graders. However, the road working machinery and the controlling apparatus therefor are herein disclosed to show the necessity of the upwardly bowed portion of the main frame and to show the particular adaptation to such a frame of a demountable tractor unit by means of my improved mechanism which affords ample flexibility in actual operation over rough and irregular ground surfaces.

For the purpose of raising or lowering the scarifier a hydraulic motor comprising a cylinder 31 is disposed between the forward converging and downwardly inclined portions 13', 13' of the main frame, and approximately parallel to said portions. The rear end of the cylinder 31 is pivoted at 32 to the cylindrical cross-brace 24 intermediate the ends of the latter as shown in Fig. 5. This hydraulic motor is connected by means of the piston 33 and piston rod 34 to the lower end of the arm 35' which in turn is secured to the transverse rockshaft 35 journaled in bearings 36, 36 mounted on the beams 13', 13'. Secured to the ends of the rockshaft 35 are rearwardly projecting crank arms 37, 37, the rear ends of which are connected by means of universal joints 38, 38, to the upper ends of the hangers 39 the lower ends of which are connected by means of the universal joints 40 to the rear ends of the scarifier arms 26 and to the scarifier frame 41, as shown in Fig. 2. The scarifier may be lifted or lowered and locked in adjusted positions by controlling the flow of liquid to and from the cylinder 31.

While only one hydraulic motor is sufficient for operating the scarifier it is desirable to use two spaced-apart hydraulic motors comprising the cylinders 42, 42' for adjusting the moldboard. The cylinders 42, 42' are pivoted at 43, 43' to the transverse cylindrical cross-brace 24' as shown in Fig. 5. By means of the pistons 44, 44' and piston rods 45, 45' these hydraulic motors are operatively connected to the lower ends of the depending arms 46, 46' which are secured to short shafts 47, 47' journaled in bearings 48, 48' mounted on the tops of the beams 13, 13. The outer ends of the shafts 47, 47' are secured to the rearwardly extending crank arms 50, 50'. The rear or outer ends of the crank arms are connected by means of universal joints 51, 51' to the upper ends of the hangers 52, 52', the lower ends of which are connected by means of the universal joints 53, 53' to the rear end of the drawbar 28 at spaced-apart points.

As is usual in graders the circle carrying the moldboard is rotatable in a horizontal plane when the ends of the hangers are at the same elevations on opposite sides of the machine, so that the moldboard 30 may be inclined in one direction or the other relative to the line of draft and held in such adjusted position during operation of the grader. This is common and well-known construction in graders and the means whereby it is accomplished needs no further disclosure nor is it deemed necessary to describe the means whereby the moldboard is tilted forwardly or rearwardly relatively to the road surface.

It should be noted that the hydraulic motors comprising the cylinders 42 and 42' are independently controllable and therefore the hangers 52 and 52' may be separately and independently operated to effect tilting of the moldboard to various degrees transversely to the line of draft.

For the purpose of supplying a pressure medium to the hydraulic motors I have provided a gear pump 54 at the front end of the frame 21 of the internal combustion engine 22 for operation thereby. Inasmuch as gear pumps of this character are well-known I have not considered it necessary to illustrate the details thereof. Although it is preferred to connect the driving shaft of the gear pump to the crank shaft of the engine it should be understood that the gear pump may be driven from any other shaft of the power plant.

In Fig. 1 the gear pump is located near the lower edge of the radiator 55 at the center of the forward end of the engine frame 21. This position is preferred to afford ample space for the flexible pipe connections 55' and 56 which extend upwardly from the pump to the piping rigidly mounted on the main frame 13. Such flexible connections 55' and 56 afford freedom of vertical oscillating movements through a relatively wide range, of the forward end of the tractor unit.

Figures 7, 8, 9:
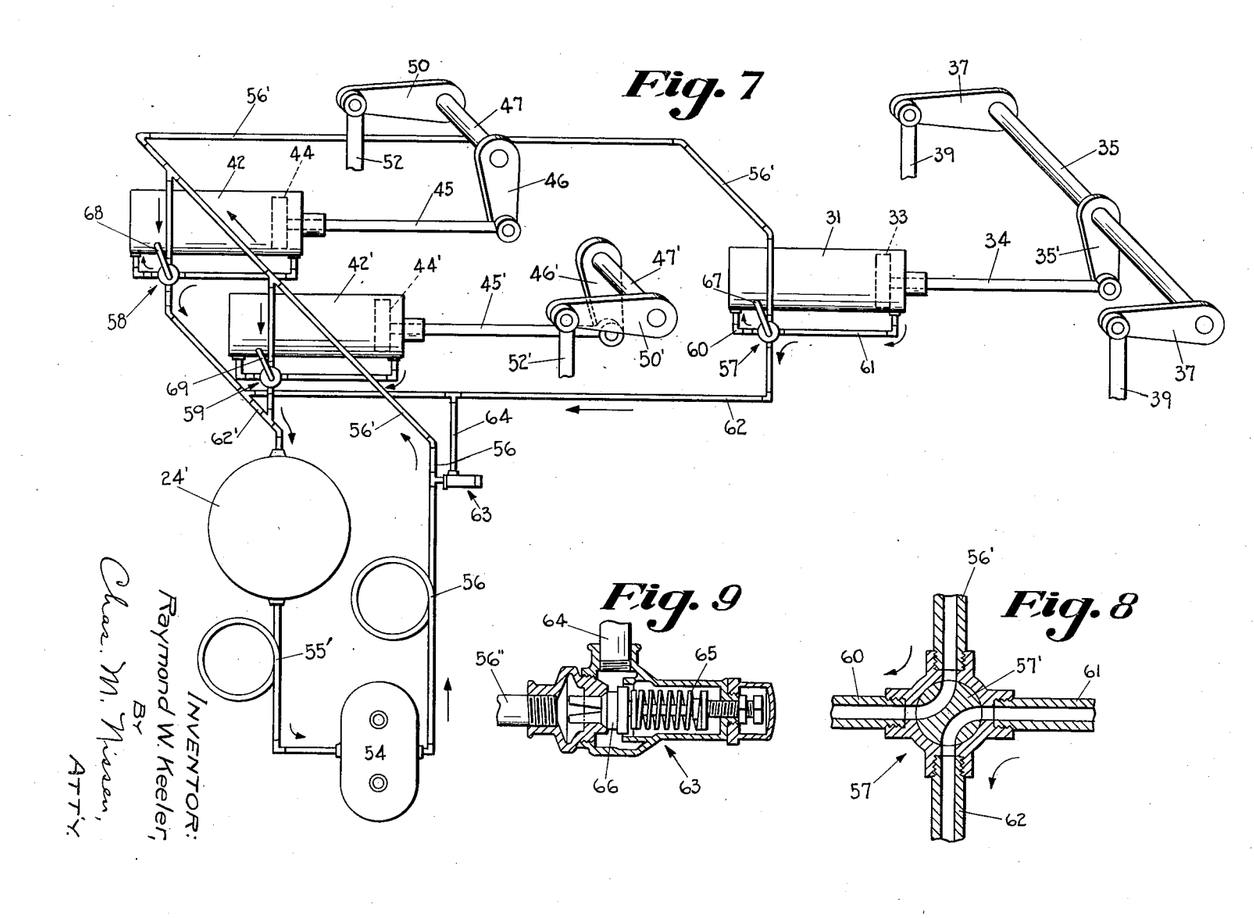
Fig. 7 is a diagrammatic view of the hydraulic operating mechanism shown in Figs. 1, 2, 5 and 6.
Fig. 8 is a sectional view through one of the valves for controlling the operation of the hydraulic motors.
Fig. 9 is a longitudinal section through a relief valve used in the hydraulic controlling system.

The hollow or tubular cross-brace 24' constitutes the supply tank for the hydraulic pressure medium. As shown in Figs. 1 and 7 the pump 54 withdraws the liquid from the supply tank 24' through the flexible pipe connection 55' and forces it through the other flexible pipe connection 56 into the piping system rigidly mounted on the frame 13 and connected to the cylinders 31, 42 and 42' of the hydraulic motors shown in Figs. 5 and 7.

Each of the hydraulic motors comprising the cylinders 31, 42, 42' is controlled by a four-way valve such as that shown in section in Fig. 8. By referring to Fig. 7 it will be seen that the supply pipe 56 is connected through the pipe 56' to each of the valves 57, 58, and 59. If the valve 57' is in the position shown in Fig. 8 the supply pressure will extend through the pipe 60 to the rear of the piston 30 in the cylinder 31 and at the same time the liquid will flow from the cylinder 31 ahead of the piston 31 through the pipe 61 into the return pipes 62, 62' into the supply tank 24' as indicated by the arrows in Fig. 7. By moving the valve 57' ninety degrees from the position shown in Fig. 8 the piston 33 in the cylinder 31 may be moved in the opposite direction. Intermediate these two positions the valve 57' will be in closed position thereby locking the piston 33 in adjusted position and consequently the scarifier will be locked at adjusted elevation.

The valves 58 and 59 being similar to the valve 57 the pistons 44, 44' may be moved in opposite directions and locked in adjusted positions thereby locking the moldboard at adjusted elevation and inclination.

Preferably a relief by-pass valve 63 is connected by means of the T-coupling 56" to the supply pipe 56 and by means of the pipe 64 to the return pipe 62. When any one of the pistons 33, 44, 44' is moving the spring 65 holds the valve 66 closed but when all of the valves 57, 58 and 59 are closed and the pump 54 continues to operate the pressure in the T-coupling 56" will be sufficient to open the valve 66 against the action of the spring 65 and the liquid will by-pass through the pipes 64, 62, 62'. Such by-passing will also take place when the pistons 33, 44, 44' reach the ends of their strokes and the valves 57, 58, 59 remain open. The relief valve 63 therefore protects the cylinders 31, 42, 42' against undue pressure but nevertheless pressure on the pistons is maintained if the operator should forget to close the valves 57, 58, and 59 or any of them.

The valves 57, 58, 59 are provided with operating levers 67, 68, 69, respectively, as shown in Fig. 7, and these levers are connected by means of the long links 70, 71, 72 to three separate and independent manually operable levers 73, 74, 75, as shown in Fig. 5. Each of these manual levers is mounted at the operator's station as shown in Fig. 1. Each lever may be held in any one of three positions corresponding to the three positions of the valve to which it is connected. Such mechanism for holding the manual lever may be of well-known construction comprising a notched sector 76.

I have found that by placing the valves 57, 58, 59 immediately adjacent to the cylinders 31, 42, 42', a very quick response is secured, whereas if the valves are disposed at the operator's station it would take appreciably longer to build up pressure in the longer system of piping than would be necessary.

The control of the valves 57, 58, 59 requires but a minimum of exertion on the part of the operator at the single station at the rear end of the grader. His muscular exertion will be limited to rotating the shaft 76' to adjust the circle 29 relative to the drawbar 28, push and pull the rod 77 (Fig. 2) to operate the circle latch mechanism 78, and to operate the steering wheel 79. Consequently, his attention may be concentrated on the character of the road on which the grader is working to scrape away or fill irregularities.

By placing the cylinders 31, 42, 42' in approximately horizontal positions between the longitudinal beams 13, 13, strength, rigidity, compactness and simplicity of frame construction is secured and very rigid support for the cylinders is provided. With this arrangement a more powerful lifting effect can be obtained than from vertically arranged hydraulic cylinders. By mounting the hydraulic cylinders at their rear ends upon the rigid transverse cross-braces 24, 24' and connecting the piston rods to arms mounted upon transverse shafts which are rigidly supported on the beams 13, 13, the hydraulic cylinders, pistons, piston rods and the connections to the crank arms, are held rigidly in alinement with each other against inevitable shocks, jars and twisting strains which occur in practice. The stresses and strains to which machines of this character are subject tend to throw the hydraulic adjusting mechanism out of line and therefore cause wear and render operation difficult. This is entirely avoided by means of the construction disclosed because not only do the tubular cross-braces serve as supports for the rear ends of the hydraulic cylinders but by being welded to the beams 13, 13, serve to form a very rigid and strong grader supporting frame wherein the longitudinal distortion is greatly minimized.

In order to provide shock absorbing mechanism between the grader frame and the front end of the demountable tractor unit I have provided elongated telescopic hangers 80 and 81 as shown in Fig. 1 pivoted respectively at their upper ends at 82, 83 on transverse horizontal axes, to the beams 13, 13, and pivoted at their lower ends at 84, 85 on transverse horizontal axes to the front end of the engine frame 22.

Figure 11:
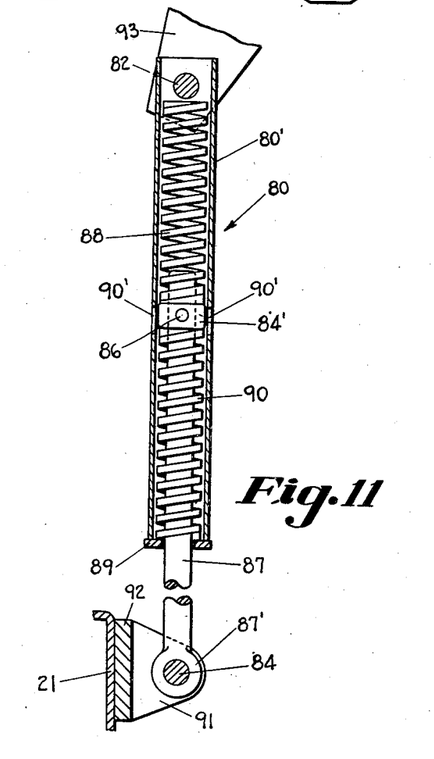
Fig. 11 is an enlarged longitudinal sectional view of one of the hangers to show the self-centering shock-absorbing springs therein.
Figure 12:
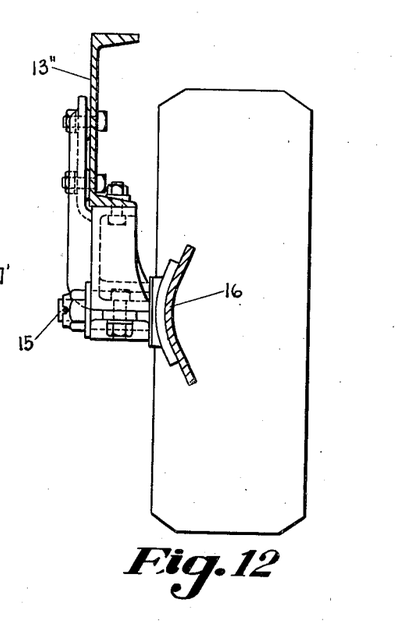
Fig. 12 is an enlarged sectional elevation of the structure pivotally connecting the crawler tractor unit to the vehicle frame to afford vertical oscillation of the tractor unit to the extent permitted by the resilient telescopic hangers.

One of the shock-absorbing hangers is shown in enlarged section in Fig. 11 as comprising a tube 80' intermediate the ends of which is slidably fitted the collar 84 which is secured at 86 to the rod 87. Within the tube 80' between the pivot pin 82 and the collar 84' is a compression spring 88 and between the lower side of the collar 84 and the cap plate 89 is another compression spring 90. The collar 84 in the tube 80' and the fit of the rod 87 in the hole at the center of the cap plate 89 may be relied on to hold the tube and rod in rigid alinement whether the hanger is contracted or extended. Lubricating openings 90', 90' are provided midway between the ends of the tube 80'.

The lower end of the rod 87 is provided with an eye 87' to fit between ears 91 of the bracket plate 92 which is secured as by means of welding to the engine frame. The upper end of the tube 80' is located between the ears 93, 93 as shown in Fig. 11. The ears 93, 93 may be secured by welding to the bottom of the tubular cross-brace 24' immediately inside of the beams 13, 13.

The construction of both the hangers 80 and 81 is the same as that illustrated in Fig. 11 and both hangers are connected at their upper and lower ends to the grader frame and to the engine frame in the same way but each hanger may be extended or contracted differently from the other.

When both of the crawlers 17, 17' strike an obstruction extending entirely across the road and at right angles thereto or when such crawlers ride into a depression extending entirely across the road and at right angles thereto, the hangers 80, 81 by reason of the springs 88, 90 therein relieve the shock, and since the springs are self-centering the crawlers will be returned to normal and held there when the grader is traveling along a level road surface. The connections between the crawlers and the engine are such that the whole tractor unit including the crawlers are oscillated on the horizontal axis of the pivots 15 on the spaced-apart crawlers at the opposite sides of the unit. The elongated hangers 80 and 81 permit a relatively wide range of oscillating tilting movement of the tractor unit on the pivots 15 when the crawlers ride over a hillock or into a depression in the road.

It should be understood that the engine 22 is mounted on the leaf springs 20' on opposite sides of the tractor unit and these leaf springs are in turn mounted on studs 20 projecting inwardly from the tractor frames. The engine therefore has a limited vertical movement relative to the crawler frames on the axis of the engine transmission shaft 94 which is connected to the crawler driving mechanism.

While it is desirable to rigidly connect the crawler frames by means of the cross bar 19 and mount the leaf springs 20 to reduce to a minimum the lateral movement of the engine relative to the crawler frames, a slight relative movement of this nature will occur when one crawler rides over an obstruction or into a depression while the other crawler remains on the level. Slight lateral movement of the engine will take place under such conditions, relatively to the grader frame, but since the elongated shock absorbing hangers are spaced apart at opposite sides of the front end of the engine one may be extended or contracted more than the other while at the same time taking care of the tilting of the whole tractor unit on the transverse axis 15.

Furthermore, when one crawler rides over an obstruction or into a depression at one side of the road the whole grader frame may move laterally on a longitudinal horizontal axis at the forward end of the frame as shown in Figs. 2, 3, and 4 without interfering with the front wheel steering mechanism.

A bolster 95 is secured to the front end of the grader frame and is provided with slots 96, 96 in a bifurcation fitting over the front axle. A pin 98 secured to the axle and extending forwardly and rearwardly therefrom fits in the slots 96, 96. The structure shown in Figs. 2, 3 and 4 constitutes a pivoted bolster for permitting oscillation of the grader frame as a whole relatively to the axle 97 on a general longitudinal axis. When traveling over a level surface the feet 99, 99 both rest on the top of the axle 97 but when the grader frame tilts laterally one of the feet is moved up until the pin 98 is engaged by the lower ends of the slots 96.

The bolster structure shown in Figs. 2, 3, and 4 is the same as that shown and claimed specifically in the Arndt Patent No. 1,684,302, granted September 11, 1928, for an Improvement in bolsters. As therein explained the front axle bolster rests flat upon the axle and gives a very firm foundation or support to the grader frame whereby all chattering or wavy motion along the road is obviated while at the same time when the front end of the grader is thrown to an extreme position as for example when it is run up on a bank or down into a ditch the front axle will be permitted to flex sufficiently but not excessively to compensate for the conditions imposed upon it, means being provided whereby the bolster will be in all positions of the axle held central or at the middle thereof, all undue twisting strains upon the parts being avoided. It will thus be seen that the front bolster permits transverse tilting of the front axle relatively to the grader frame when the front wheels are not on a level surface.

The improvements shown in the accompanying drawings cooperate with the front bolster structure in giving the latter an additional duty to perform in that when the front wheels are on a level surface and one of the crawlers rides up on a boulder at one side of the road not only will the front end of the tractor unit compress the springs 90 in the elongated hangers 80, 81, but the whole grader frame will tilt laterally on the bolster pivot 98 at the front end of the machine while the front axle remains horizontal and both front wheels remain on the road surface.

Furthermore, when one crawler strikes a boulder on one side of the road lifting action is imparted through the leaf spring 20 to the engine frame 21 on the adjacent side of the tractor unit. At the same time the crawler at the other side of the tractor unit is moved upwardly by forces exerted through the cross bar 19 and the leaf spring on the opposite side of the tractor unit. There is therefore a small tilting movement of the crawler frame on the axis of the driving shaft 94 as permitted by the stiff leaf springs 20 but there is only a slight lateral movement of the engine relative to the grader frame. To assist the connections between the tractor unit and the grader frame in preventing relative lateral movement the ends of the hangers 80 and 81 are pivoted on transversely extending axes between spaced ears as shown in Fig. 10 and the hangers themselves although extensible are braced against lateral bending by the collar 84 fitting in the tube 80' and by rod 87 fitting in the hole in the cap 89.

The tractor unit can very easily be removed from the grader frame by detaching the lower ends of the hangers 80 and 81 from the front end of the engine, unbolting the lower cap plates 100 from the stud bearings 15 since the operator's platforms and the controlling mechanism within his reach are mounted on the main support frame beams.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In a vehicle, the combination with a supporting frame, of a tractor unit pivoted thereto on a horizontal axis, spaced-apart vertical hangers depending from the sides of said frame and each comprising a rod guided into a tube, and flexible connections between the upper ends of said hangers and said frame and between the lower ends of said hangers and the front portion of said tractor unit, said flexible connections being on horizontal axes permitting swinging of said hangers in planes extending longitudinally of said frame and vertical movements of the front end of said tractor unit relatively to said frame but restricting lateral movement of such front end relatively to said frame.

2. In a road building machine, the combination with a supporting frame, of a crawler tractor unit comprising an engine pivoted to said frame for oscillation relatively thereto on a horizontal axis, spaced-apart extensible yielding hangers for supporting from said frame opposite sides of the front portion of said engine, steering mechanism connected to the front end of said frame, and a pivotal connection between the front end of said frame and said steering mechanism to afford oscillation of the tractor unit and the frame on a longitudinal axis.

3. In a road making machine, the combination with a supporting frame, of a crawler tractor unit comprising a crawler frame and an engine mounted on said crawler frame, pivotal connections between opposite sides of the rear portion of said supporting frame and opposite sides of said crawler frame to permit said crawler tractor unit to oscillate vertically on a horizontal axis, spaced apart extensible resilient hangers connecting said supporting frame to the forward corners of said engine, steering mechanism at the front end of said supporting frame, and a pivot between said supporting frame and said steering mechanism on an axis extending longitudinally of said supporting frame to permit tilting of said supporting frame together with said crawler tractor unit on such longitudinal axis while said hangers permit vertical oscillation of the tractor unit on said horizontal axis when one side of the crawler tractor unit travels over an obstruction.

4. In a road making machine, the combination with a main supporting frame, of front steering mechanism comprising a transverse axle, a bolster connecting the front end of said frame to said axle for limited movement of said frame relatively to said axle on a longitudinal axis, a crawler tractor unit comprising an engine and a crawler frame pivoted to said main supporting frame for oscillation on a horizontal transverse axis, said crawler tractor unit being movable laterally with said main supporting frame, and spaced-apart elongated shock-absorbing devices between said main supporting frame and the front end of said engine.

5. A road-building machine comprising a supporting frame, a tractor unit pivoted thereto for movement relatively thereto on a horizontal axis, shock absorbing mechanism between said supporting frame and the front end of said tractor unit said shock absorbing mechanism comprising spaced-apart vertical tubes each with compression springs enclosed thereby with a rod connected to the tube for movement longitudinally relatively thereto, and means for pivotally connecting the tubes and the rods between the frame and the front end of the tractor unit on horizontal transverse axes to co-operate with the shock absorbers to limit lateral movement of the front end of the tractor unit relatively to said supporting frame while permitting a relatively wide range of vertical movement of the front end of the tractor unit relatively to said supporting frame.

6. In a road working machine, the combination with a supporting frame, of a road-working implement mounted thereon, wheels for the front end of said frame, a power-driving tractor unit for pivotally supporting the rear end of said supporting frame and for pushing the road-working implement along a roadway, spaced-apart elongated shock-absorbing devices between the frame and said tractor unit forwardly of the pivotal connection between said frame and said tractor unit, an axle for the front wheels, and a bolster connecting the front end of said frame to said axle for limited movement of said frame relatively to said axle on a longitudinal axis.

7. In a road working machine, the combination with a supporting frame, of front wheels at the forward end thereof, a tractor unit for pivotally supporting the rear end of said frame and for pushing the frame along a roadway, road-working mechanism carried by said frame, shock-absorbing mechanism forwardly of the pivotal connection between said frame and said tractor unit for cushioning vertical oscillation of the forward end of the tractor unit relatively to said frame when the tractor unit travels over irregularities in the roadway and for yieldingly holding the forward end of the tractor unit for travel over a level roadway, an axle for the front wheels, and means for connecting the front end of said frame and said axle for permitting said frame together with said tractor unit to move laterally relatively to said axle on a longitudinal axis while said wheels remain upon the roadway and one side of said tractor unit rides over an obstruction or depression in the roadway.

8. In a power-driven vehicle, the combination with a supporting frame, of front wheels, an axle for said wheels, a bolster connecting the front end of said frame to said axle for limited movement of said frame relatively to said axle on a longitudinal axis, a tractor unit comprising a power plant, a pivotal connection on a transverse horizontal axis between said tractor unit and said frame rearwardly of the front end thereof to enable said tractor unit to push said frame with the front end thereof supported on said axle and said front wheels, and shock-absorbing mechanism between said frame and said tractor unit forwardly of said pivotal connection for cushioning vertical oscillation of said tractor unit on said horizontal axis and yieldingly holding said tractor unit in predetermined position relative to said frame on level ground.

9. In a power-driven vehicle, the combination with a supporting frame, of wheels for one portion of said frame, an axle for said wheels, a bolster connecting said frame to said axle for limited movement of said frame relatively to said axle on a longitudinal axis, a tractor unit comprising a power plant for supporting another portion of said frame, a pivotal connection on a transverse horizontal axis between said tractor unit and said frame, and shock absorbing mechanism between said frame and said tractor unit in spaced relation to said pivotal connection for cushioning vertical oscillations of said tractor unit relatively to said frame and for yieldingly supporting said tractor unit in predetermined relation to said frame when the power-driven vehicle travels over a level roadway.

10. In a power-driven vehicle, the combination with a supporting frame, of wheels for one portion of said frame, a tractor unit for another portion of said frame, a pivotal connection on a transverse horizontal axis between said tractor unit and said frame, shock-absorbing mechanism connected between said tractor unit and said frame in spaced relation to said pivotal connection, an axle for said wheels, and a bolster connected between said frame and said axle for limited movement of said frame relatively to said axle, said tractor unit being movable laterally with said supporting frame on a longitudinal axis as permitted by said bolster.

11. In a power-driven vehicle, the combination with a supporting frame, of wheels for a portion thereof, a tractor unit for another portion of said frame, a pivotal connection on a horizontal transverse axis between said tractor unit and said frame, an axle for said wheels, a bolter connected between said frame and said axle for limited movement of said frame relatively to said axle on a longitudinal axis, and shock-absorbing mechanism between said tractor unit and said frame permitting vertical oscillation of said tractor unit on said horizontal axis relatively to said frame but restricting lateral movement of said tractor unit relatively to said frame, the tractor unit being movable laterally with said supporting frame on said longitudinal axis as permitted by said bolster.

12. In a power-driven vehicle, the combination with a push frame, of front wheels for the front end thereof, an axle for said wheels, a bolster connecting the front end of said frame to said axle for limited movement of said frame relatively to said axle on a longitudinal axis, a tractor unit for the rear end of said frame, a pivotal connection on a horizontal transverse axis between the rear end of said frame and said tractor unit, shock-absorbing mechanism spaced forwardly from said pivotal connection and connected between said tractor unit and said frame, steering mechanism for the front wheels, and means for operating said steering mechanism from the tractor unit control station.

13. In a power-driven vehicle, the combination with a supporting frame, of wheels for one portion thereof, a tractor unit for another portion of said frame, a pivotal connection on a transverse horizontal axis between said tractor unit and said frame, telescopic elongated shock-absorbing hangers between said frame and said tractor unit, mechanism connecting said hangers to said frame and tractor unit and adapted to co-act with said telescopic hangers to restrict lateral movement of said tractor unit relatively to said frame, an axle for said wheels, and a bolster connecting said frame to said axle for limited movement of said frame and tractor unit relatively to said axle on a longitudinal axis, said tractor unit being movable laterally with said supporting frame irrespective of the position of the forward end of said tractor unit relative to said frame.

14. In a vehicle, the combination with a supporting frame, of an engine, propelling mechanism operatively connected to said engine, means pivotally supporting said engine on the rear portion of said frame for free oscillation vertically of the forward end of said engine on a horizontal axis, self-centering shock-absorbing mechanism suspended from said frame and connected to the front portion of said engine for yieldingly maintaining the engine in predetermined relation to said frame when the machine travels over horizontal ground and permitting vertical oscillation of the forward end of said engine relatively to said frame through wide limits when the machine travels over rough ground, and pivotal connections between the ends of said shock-absorbing mechanism and said frame and the front portion of said engine, said pivotal connections comprising pairs of bracket plates to confine such pivotal connections to horizontal transverse axes.

15. In a road building machine, the combination with an open supporting frame comprising spaced-apart longitudinal beams having upwardly arched portions intermediate their ends, of steering mechanism comprising front steering wheels, road-working mechanism carried beneath said upwardly arched beams, a power plant pivotally connected to the rear portion of said beams for oscillation vertically between said beams on a horizontal axis, traction mechanism supporting the rear end of said beams and operatively connected to said power plant, spaced-apart hangers each comprising a rod guided into a tube with two springs enclosed in each tube and associated with a collar between the springs and connected to the inner end of the rod, pivotal connections on transverse horizontal axes between the upper ends of said hangers and the upwardly arched portions of said beams, and additional pivotal connections on horizontal transverse axes between the lower ends of said hangers and the front end portion of said power plant.

16. In a road working machine, the combination with a grader frame, of wheels for supporting one end of said frame, a tractor unit for supporting the other end of said frame, means pivotally connecting said grader frame to said tractor unit, said tractor unit including a motor supporting frame and traction wheel supporting frames, means including springs for resiliently connecting said traction wheel supporting frames to said motor supporting frame, and spring means for connecting the forward end of said motor supporting frame to said grader frame, whereby restricted pivotal movement is provided between said tractor unit and said grader frame.

17. In a road building machine, the combination with a supporting frame, of a tractor unit pivoted to said frame at one end thereof for oscillation on a transverse horizontal axis, spaced-apart yieldable hangers interconnected between said tractor unit and said frame and constructed and arranged to provide a flexible connection therebetween providing for limited pivotal movement about said transverse axis and restricting lateral movement of said unit relative to said frame, steering and supporting mechanism connected to the other end of said frame, and pivotal connecting means between said other end of said frame and said steering and supporting mechanism constructed and arranged to afford relative oscillation therebetween on either one of a pair of laterally spaced longitudinally extending axes.

18. In a road building machine, the combination with a supporting frame, of a tractor unit pivoted to said frame at one end thereof for oscillation on a transverse horizontal axis, spaced-apart yieldable hangers interconnected between said tractor unit and said frame and constructed and arranged to provide a flexible connection therebetween providing for limited pivotal movement about said transverse axis, steering and supporting mechanism connected to the other end of said frame, and pivotal connecting means between said other end of said frame and said steering and supporting mechanism constructed and arranged to afford relative oscillation therebetween on either one of a pair of laterally spaced longitudinally extending axes.

19. In a road working machine, the combination with a grader frame, of wheels for supporting one end of said frame, a tractor unit for supporting the other end of said frame, means connecting said tractor unit to said grader frame for pivotal movement about a transverse axis, said tractor unit including a motor supporting frame and traction means supporting frames, spring means for resiliently connecting said traction means supporting frames and said motor supporting frame, and additional spring means for connecting the motor supporting frame to said grader frame.

20. In a road working machine, the combination with a grader frame, of steering wheel means for supporting the front end of said frame, a crawler type tractor unit for supporting the rear end of said frame, means connecting said tractor unit and said grader frame at the rear end of the latter for pivotal movement about a transverse axis, said tractor unit including a motor supporting frame and crawler supporting frames, means including springs for resiliently connecting said motor supporting frame and said crawler supporting frames, and additional spring means connecting said motor supporting frame to said grader frame.

21. In a road working machine, the combination with a grader frame comprising a pair of spaced longitudinally extending beams, of steering and supporting wheels adjacent the front end of said frame, a crawler type tractor unit for supporting the rear end of said frame, means pivotally connecting the rear end of said grader frame to the rear end of said tractor unit for relative pivotal movement on a transverse axis, said tractor unit comprising a motor frame and a pair of crawler supporting frames, spring means connecting said motor frame and said crawler supporting frames, and additional spring means connecting the front of said motor frame to said beams of said grader frame.

RAYMOND W. KEELER.